(12) United States Patent
Weirauch et al.

(10) Patent No.: US 7,996,606 B2
(45) Date of Patent: Aug. 9, 2011

(54) SYSTEM AND METHOD FOR WRITING DATA AND A TIME VALUE TO AN ADDRESSABLE UNIT OF A REMOVABLE STORAGE MEDIUM

(75) Inventors: Charles R. Weirauch, Loveland, CO (US); Jakob Gerrit Nijboer, Geldrop (NL); Christiaan Steenbergen, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/966,718

(22) Filed: Dec. 13, 2010

(65) Prior Publication Data
US 2011/0082974 A1    Apr. 7, 2011

Related U.S. Application Data

(63) Continuation of application No. 11/003,052, filed on Dec. 3, 2004, now Pat. No. 7,877,543.

(51) Int. Cl.
*G06F 12/00* (2006.01)
*G06F 13/00* (2006.01)
*G06F 13/28* (2006.01)

(52) U.S. Cl. .............. 711/112; 711/154; 711/E12.001

(58) Field of Classification Search .............. None
See application file for complete search history.

(56) References Cited

U.S. PATENT DOCUMENTS

| | | | |
|---|---|---|---|
| 4,578,722 A | | 3/1986 | Lovgren et al. |
| 4,688,169 A | * | 8/1987 | Joshi .............................. 726/29 |
| 4,827,462 A | * | 5/1989 | Flannagan et al. ........ 369/30.09 |
| 5,053,948 A | * | 10/1991 | DeClute et al. ........................ 1/1 |
| 5,119,291 A | * | 6/1992 | Flannagan et al. ................ 711/4 |
| 5,640,506 A | * | 6/1997 | Duffy ........................... 714/6.12 |
| 5,889,934 A | * | 3/1999 | Peterson ..................... 714/6.12 |
| 5,909,692 A | * | 6/1999 | Yanai et al. ....................... 711/4 |
| 5,940,854 A | * | 8/1999 | Green et al. ................... 711/112 |
| 6,295,262 B1 | * | 9/2001 | Kusumoto et al. ......... 369/53.37 |
| 6,330,210 B1 | * | 12/2001 | Weirauch et al. .......... 369/30.11 |
| 6,345,385 B2 | * | 2/2002 | Imamura et al. ............. 717/120 |
| 6,405,329 B1 | | 6/2002 | Colligan et al. |
| 6,523,132 B1 | * | 2/2003 | Harari et al. ................ 714/6.13 |
| 6,584,544 B1 | * | 6/2003 | Morley et al. ................ 711/114 |
| 6,625,732 B1 | * | 9/2003 | Weirauch et al. ............... 726/26 |

(Continued)

FOREIGN PATENT DOCUMENTS
WO    WO 2004059404    7/2004

OTHER PUBLICATIONS

I. Sanchez et al., "Method for Tracking Programs and Data Storage Media," IBM Technical Disclosure Bulletin, vol. 37, No. 08, Aug. 1984, 1 p.

(Continued)

*Primary Examiner* — Matt Kim
*Assistant Examiner* — Matthew Chrzanowski

(57) ABSTRACT

A system (and associated method) comprises a storage drive and a central processing unit ("CPU"). The storage drive is adapted to accommodate a removable storage medium. The CPU is configured to cause the CPU to write data and a time value to each of a plurality of addressable units of the storage medium in which data is written. The time value is indicative of the time at which each addressable unit was written with data.

8 Claims, 4 Drawing Sheets

U.S. PATENT DOCUMENTS

| | | | |
|---|---|---|---|
| 6,856,993 B1* | 2/2005 | Verma et al. ............................ 1/1 |
| 7,877,543 B2* | 1/2011 | Weirauch et al. .............. 711/112 |
| 2001/0048659 A1* | 12/2001 | Weirauch et al. ........... 369/275.3 |
| 2002/0126407 A1 | 9/2002 | Blaum et al. |
| 2003/0014617 A1* | 1/2003 | Tamboli et al. .................... 713/1 |
| 2003/0028726 A1* | 2/2003 | Gaertner et al. .............. 711/114 |
| 2003/0035565 A1 | 2/2003 | Rhoads |
| 2003/0084262 A1* | 5/2003 | Weirauch ....................... 711/170 |
| 2003/0145090 A1* | 7/2003 | Ostergaard .................... 709/229 |
| 2003/0191952 A1 | 10/2003 | Anderson et al. |
| 2003/0194214 A1 | 10/2003 | Anderson et al. |
| 2003/0200038 A1* | 10/2003 | Schweitzer et al. ............. 702/65 |
| 2003/0236933 A1* | 12/2003 | Shigeta et al. ................... 710/72 |
| 2004/0085229 A1 | 5/2004 | Weirauch |
| 2004/0088556 A1 | 5/2004 | Weirauch |
| 2004/0199566 A1* | 10/2004 | Carlson et al. ................. 709/201 |
| 2004/0230605 A1* | 11/2004 | Tamboli et al. ................. 707/102 |
| 2005/0122852 A1* | 6/2005 | Han et al. .................... 369/30.03 |
| 2006/0021041 A1* | 1/2006 | Challener et al. ............... 726/24 |
| 2006/0075202 A1* | 4/2006 | Gaertner et al. .............. 711/162 |
| 2006/0123190 A1* | 6/2006 | Weirauch et al. .............. 711/112 |
| 2006/0155920 A1* | 7/2006 | Smith et al. .................... 711/103 |

OTHER PUBLICATIONS

Search Report dated Sep. 26, 2007, Netherlands Patent Application No. 1030567, 4 p.

Charles M. Kozierok, NTFS File Attributes.: http://web.archive.org/web/20010502064609/http://www.pcguide.com/ref/hdd/file/ntfs/filesAttr-c.html. Apr. 17, 2001. pp. 1-2.

Digital Display Working Group, "Digital Visual Interface DVI, Revision 1.0," Apr. 2, 1999, 76 pp.

Weirauch et al., Office Action dated Oct. 20, 2006, U.S. Appl. No. 11/003,052, filed Dec. 3, 2004.

Weirauch et al., Response to Office Action dated Oct. 20, 2006 filed Jan. 16, 2007, U.S. Appl. No. 11/003,052, filed Dec. 3, 2004.

Weirauch et al., Final Office Action dated Feb. 23, 2007, U.S. Appl. No. 11/003,052, filed Dec. 3, 2004.

Weirauch et al., Appeal Brief filed May 23, 2007, U.S. Appl. No. 11/003,052, filed Dec. 3, 2004.

Weirauch at al., Notice of Non-Compliant Appeal Brief dated Sep. 4, 2007, U.S. Appl. No. 11/003,052, filed Dec. 3, 2004.

Weirauch et al., Response to Notice of Non-Compliant Appeal Brief filed Sep. 4, 2007 filed Oct. 2, 2007, U.S. Appl. No. 11/003,052, filed Dec. 3, 2004.

Weirauch et al., Notice of Non-Compliant Appeal Brief dated Nov. 16, 2007, U.S. Appl. No. 11/003,052, filed Dec. 3, 2004.

Weirauch et al., Response to Notice of Non-Compliant Appeal Brief dated Nov. 16, 2007 filed Dec. 17, 2007, U.S. Appl. No. 11/003,052, filed Dec. 3, 2004.

Weirauch et al., Interview Summary dated Dec. 20, 2007, U.S. Appl. No. 11/003,052, filed Dec. 3, 2004.

Weirauch et al., Examiner's Answer dated Feb. 7, 2008, U.S. Appl. No. 11/003,052, filed Dec. 3, 2004.

Weirauch et al., Reply Brief filed Apr. 4, 2008, U.S. Appl. No. 11/003,052, filed Dec. 3, 2004.

Weirauch et al., Decision on Appeal dated Aug. 11, 2010, U.S. Appl. No. 11/003,052, filed Dec. 3, 2004.

Weirauch et al., Notice of Allowance dated Sep. 15, 2010, U.S. Appl. No. 11/003,052, filed Dec. 3, 2004.

* cited by examiner

SYSTEM AND METHOD FOR WRITING DATA AND A TIME VALUE TO AN ADDRESSABLE UNIT OF A REMOVABLE STORAGE MEDIUM

CROSS REFERENCE TO RELATED APPLICATIONS

This application claims priority to, and is a continuation of, U.S. application Ser. No. 11/003,052, filed Dec. 3, 2004, entitled "System And Method For Writing Data And A Time Value To An Addressable Unit Of A Removable Storage Medium," incorporated herein by reference.

BACKGROUND

Some electronic systems include a storage drive that can store data on a removable storage medium. Because the storage medium is removable, the data on the storage medium can be recorded by one or more storage drives in the same or different computer systems. It is possible that the storage medium may be recorded by a drive that has malfunctioned. A separate issue is that legal and criminal investigators may have a need to know the recording history of a particular storage medium.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The verb "record" means to store, write, or otherwise transfer data onto a storage medium.

DETAILED DESCRIPTION

Figure 1:
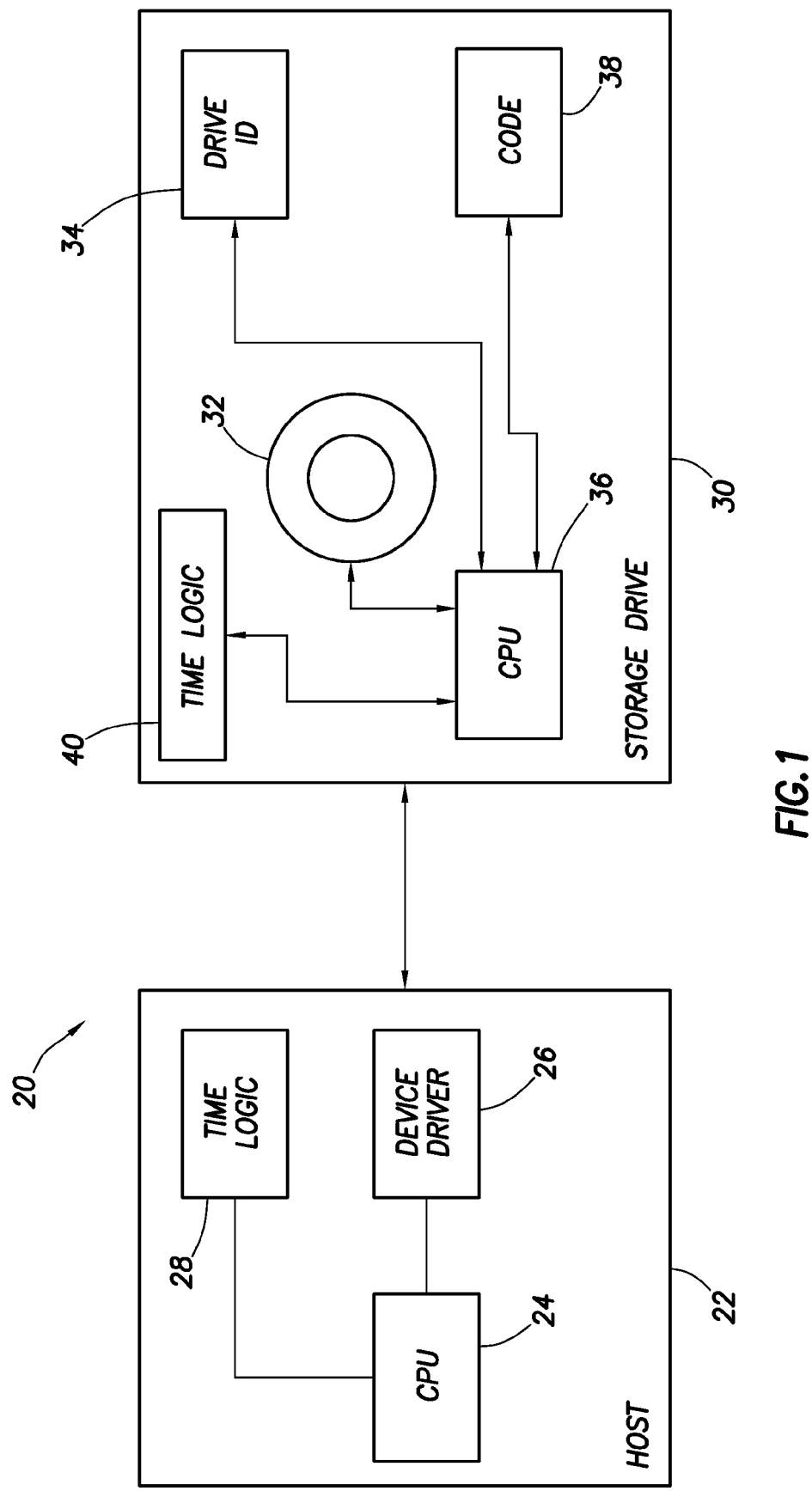
FIG. 1 shows a system in accordance with an exemplary embodiment of the invention.

FIG. 1 illustrates a system 20 implemented in accordance with an exemplary embodiment of the invention. As shown, system 20 comprises a host 22 coupled to a storage drive 30. In general, the host 22 stores data on, and reads data from, the storage drive. As such, the host 22 represents a source of data for the storage drive and/or represents a consumer of data retrieved from the storage drive for use by the host 22 or other device. The host 22 may be implemented as a computer and the storage drive 30 may be external to the computer or may be located internal to the computer. The host 22 comprises a central processing unit ("CPU") 24 and a device driver 26. The device driver 26 comprises software that is executed by the CPU 24 and causes the CPU to perform one or more of the actions described herein. The host also comprises time logic 28 that receives or keeps track of time. The time logic 28 may be implemented as a time-of-day circuit that can be programmed with the current time and can function to keep track of the progression of time. The CPU 24 interacts with the time logic 28 to obtain a value indicative of time. The value indicative of time may represent date, time of day, or both date and time of day. Alternatively, the value may comprise a sequence number that may be incremented in a suitable manner such as each time audit information is recorded to the storage drive 30. The term "time value" broadly comprises both approaches (time or date representation and sequence number) as well as a predetermined value (e.g., 00 h, FFh).

The storage drive 30 is adapted to receive a removable storage medium 32. The storage medium 32 may comprise any suitable type of medium such as an optical disk, a magnetic disk, or solid-state memory. Further, the storage medium may be implemented as a "write once" medium or a "re-writeable" storage medium. Data can be recorded onto a "write once" medium more than once, but once data is recorded to a "write once" medium (e.g., CD-R), the recorded data cannot be overwritten or erased. Data on a re-writeable storage medium can be overwritten or erased.

The storage drive 30 may also comprise a CPU 36 and code 38 that can be executed by the CPU 36. One or more of the acts described herein may be performed by the storage drive's CPU 36 executing the code 38. The storage drive 30 may also include time logic 40 coupled to, or otherwise accessible to, the CPU 36. The time logic 40 can be programmed with the current time and then function to keep track of time going forward. For example, the host 22 may provide a value indicative of the current time from the host's time logic 28 to the storage drive's time logic 40 to permit the storage drive to track the progression of time. The time logic 50 thus can function to provide a time value upon request by, for example, CPU 36. The time value from the logic 40 broadly encompasses any or all of the definitions of "time value" articulated above with regard to the time values provided by time logic 28 in the host 22.

The storage drive 30 also comprises a drive identifier ("ID") 34 that may uniquely identify the associated drive apart from all other drives. For example, the drive ID may comprise a serial number assigned by the drive manufacturer. In other embodiments, the drive ID 34 may be unique to at least some, but not all, other drives. It is generally sufficient for purposes of the subject matter disclosed herein that the drive ID 34 is such that there is a sufficiently low probability that the same storage medium 32 may be used in two or more drives having the same drive ID. The term "unique" (as in "unique" drive ID) is used in both contexts in this disclosure. The drive ID 34 may be stored in non-volatile memory in the storage drive 30 or may be hard-coded into the drive's circuitry (e.g., in unique patterns on traces formed on a printed circuit board contained in the drive). In some embodiments, the drive ID is permanent and thus not alterable. It is also suitable for the drive ID to be difficult to alter, if not permanent, without specialized equipment or processes. In other embodiments, the drive ID may comprise an identifier of the host 22 instead of, or in addition to, an identifier of the drive. Further still, the drive ID may comprise publicly available information pertaining to the system 10 or a user of system 10. The drive ID may additionally or alternatively contain private information that is lawfully retrievable pursuant to a valid legal process (e.g., a search warrant) to protect the privacy of a user of the system 10.

The drive ID 34 may comprise a value containing alphanumeric characters and/or other symbols. In at least one embodiment, the drive ID 34 comprises a 64-bit value comprising a manufacturer code (16 bits), a model code (16 bits) and a serial number (32 bits). Each different storage drive manufacturer may be assigned a unique manufacturer code and with 16 bits, there are more than 65,000 different manufacturer codes possible. Each different model, including revisions if desired, of a storage device may also be assigned a unique model code. With 16 bits used for the model code, there are more than 65,000 uniquely available model codes. The serial number generally is unique to each drive. As such, two drives of the same model and provided by the same manufacturer will still have different drive IDs because the serial number component of the drive IDs will differ. The three components of the drive ID (manufacturer code, model code, and serial number) may be concatenated together or otherwise combined or used together in any suitable manner.

In an alternative embodiment, every drive of a particular model may have the drive ID encoded in firmware running in the drives. In this embodiment, each drive of a particular model has the same 32-bit serial number. If the firmware is upgraded, the drive serial number is not changed and is still available. In accordance with another embodiment, the drive ID is generated by the host (e.g., by the CPU 24 in accordance with the device driver 26). When the drive is installed, the driver may prompt the operator for a number, which might, for example, be a human-readable serial number printed on the drive but not readable by the drive controller electronics. Alternatively, just the manufacturer number and model number could be manually entered and the device driver 26 could generate a random 32-bit serial number. Alternatively, the device driver could generate a serial number from a unique number associated with the host computer, such as a serial number of the firmware (e.g., BIOS) for the host. If the device driver 26 provides the serial number, either the device driver should save the number in non-volatile memory, or the device driver should employ a deterministic algorithm to always recreate the same number every time the driver is loaded. If the device driver provides the serial number, the drive may obtain the drive identification from the device driver at initialization time.

In general, recorded data is formatted into addressable units that may be referred to in a variety of ways. Examples of addressable units include sectors, blocks, clusters, and tracks. In the following discussion, the term "addressable unit" is used to generically refer to any or all of the units of storage listed above or other known units of storage.

Figures 2, 3:
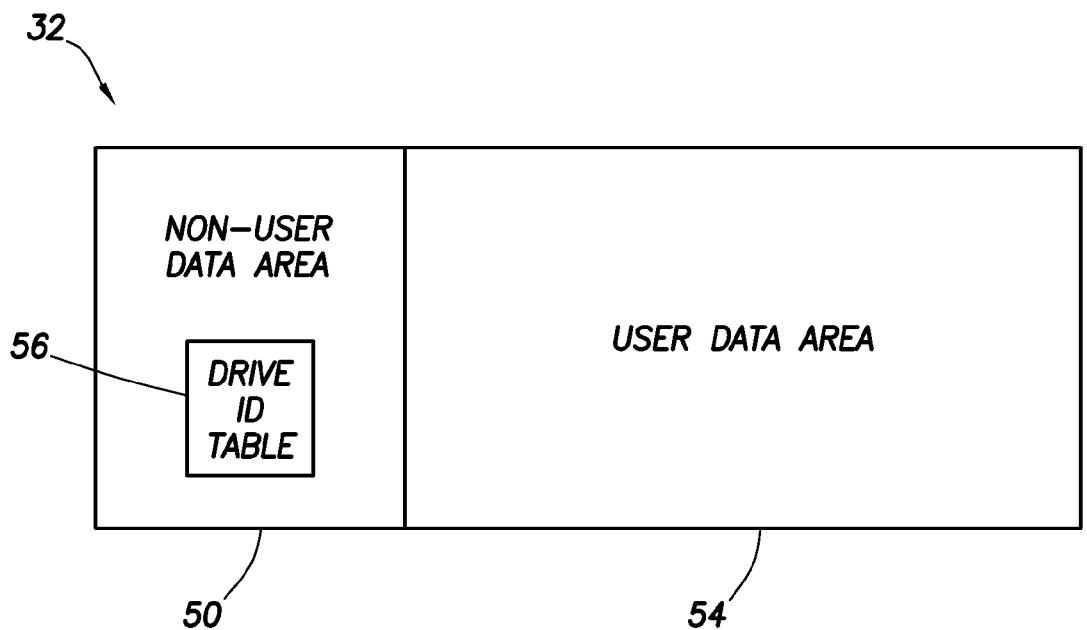
FIG. 2 illustrates an embodiment in which a drive identifier table is included on a storage medium.
FIG. 3 shows an exemplary embodiment of the drive identifier table of FIG. 2.

FIG. 2 depicts an embodiment of the storage medium 32 as comprising a non-user data area 50 and a user data area 54. The user data area 54 is where data is recorded by drive 30 on behalf of an application running on the host 22. For example, a file, such as a document or a spreadsheet, that a user desires to store on the storage medium is stored by the drive 30 in the user data area 54. The non-user data area 50 is generally unusable for storing user data and, instead, is used for control and administration purposes. In accordance with at least some embodiments of the invention, the non-user data area 50 may comprise a "lead-in" area of the storage medium such as that disclosed in U.S. Pat. No. 6,330,210, incorporated herein by reference. In the embodiment of FIG. 2, the non-user data area 50 contains a drive ID table 56. The drive ID table 56 may be initialized by the drive's CPU 36, under execution of code 38. Initializing the drive ID table may comprise reserving a portion of the non-user data area 50 for storing the table.

FIG. 3 shows an embodiment of the table 56. The table 56 is configured to contain one or more entries 62. As shown in FIG. 3, each entry 62 comprises at least a drive ID field 58. The drive ID field 58 is adapted to store a drive ID (such as those described above) associated with a storage drive. Each entry 62 may also include an index field 60. As such, each entry 62 in the table 56 may include an index value and a corresponding drive ID. For example, index value 01 h ("h" indicating hexadecimal) corresponds to the ID for drive 1 (DRIVE 1 ID). Similarly, indices 02 h and 03 h correspond to DRIVE 2 ID and DRIVE 3 ID. At least some entries 62 may be reserved for future use to store drive IDs. In the embodiment shown in FIG. 3, an index field 60 is included in the table for storing index values. In other embodiments, index field 60 is absent and, instead, the index value for each drive ID is computed based on the location in the table of the drive ID value being referenced.

In accordance with various embodiments of the invention, each time an addressable unit in the user data area 54 of the storage medium 32 is written with data by a storage drive 30, the storage drive's CPU 36, under control of code 38, also writes an index value into the same addressable unit being written with data. The index value written into the addressable unit of the storage medium 32 corresponds to the particular storage drive 30 that is performing the write operation. The index value written to the addressable unit corresponds to the ID of the drive as reflected by way of the drive ID table 56 in the non-user data area 50. For example, if drive 1 writes an addressable unit of the storage medium, then, in addition to the data, drive 1 also writes its corresponding index value into the addressable unit. Moreover, each addressable unit of storage medium 32 in which data is written is also written with an index value that identifies the particular storage drive 30 that was used to write the addressable unit. The drive may write data (e.g., a file) that may span more than one addressable unit. In accordance with the embodiments of the invention, the drive ID of the drive is written to each of the addressable units that is written with data. In addition to a drive ID, a time value is also written to each addressable unit. The time value is indicative of the time at which the addressable unit was recorded with data. The drive ID and time value recorded to each addressable unit comprises audit information that, as explained below, may be useful to diagnose problems with drives or provide helpful information for forensic analysis.

Figure 4:
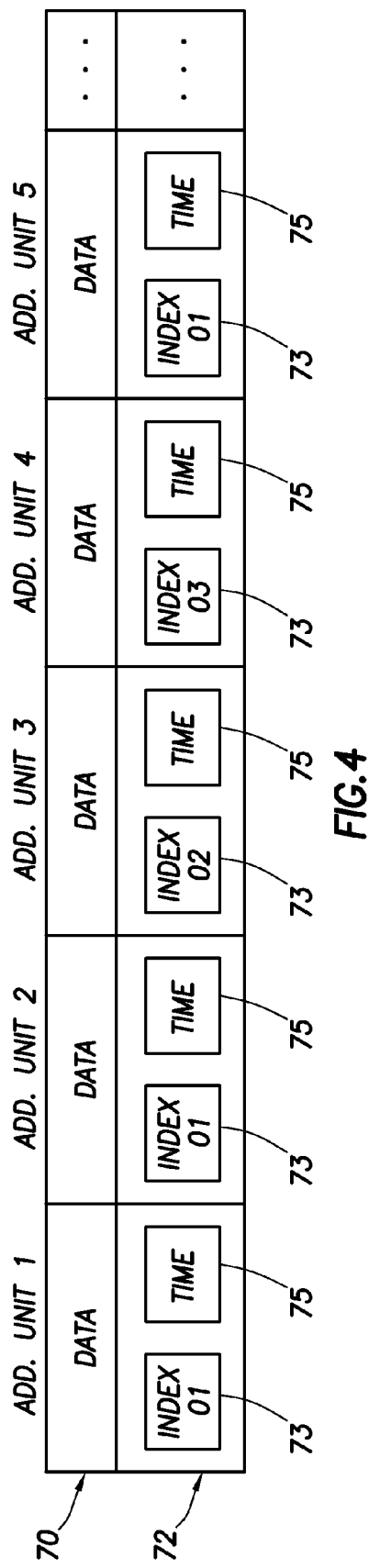
FIG. 4 shows an example of a portion of a storage medium in which index values identifying individual storage devices are stored in the addressable units of the medium.

FIG. 4 illustrates a portion of the addressable units of a storage medium 32 that comprises part of user data area 54 (FIG. 2). The portion shown in FIG. 4 includes addressable units 1, 2, 3, 4, and 5. Each addressable unit includes a first portion 70 and a second portion 72. The first portion 70 may comprise a data portion in which data is recorded, for example, on behalf of the host 22. The second portion 72 is used to record an index value 73 and a time value 75. The second portion 72 may comprise a header associated with each addressable unit. In some embodiments, an addressable unit header may include an address, control information, and other information as well as one or more reserved fields. One of the reserved fields may be used to store the index and time values. In the example of FIG. 4, drive 1 was used to write data to addressable units 1, 2, and 5 and drives 2 and 3 were used to write data to addressable units 3 and 4, respectively. Drive 1 may have also been used to write data to addressable units 3 and 4, but drives 2 and 3 subsequently overwrote whatever data may have been stored in addressable units 2 and 3, and accordingly updated the associated index values. The index values 73 identify the drives that have most recently written the addressable units and correspond to the index values 60 in FIG. 3. The time values 75 indicate when (time of day and/or date) the drive identified by the associated index value last wrote that particular addressable unit.

The storage medium 32 may also be used in conjunction with "legacy drives." A legacy drive is a drive that is not equipped to write a drive ID and/or a time value to the storage medium as described herein. Instead, a legacy drive may cause a predetermined value such as 00 h to be written to the location in the addressable unit at which a drive ID and/or time value would otherwise be written by a drive as described herein.

It may happen that all of the entries in the drive ID table 56 are written with drive IDs and, if implemented in the table, index values. When this happens and in accordance with at least some embodiments, a new storage drive that attempts to write data to an addressable unit (i.e., a drive whose drive ID is not already stored in table 56) may cause a reserved value such as 00 h or FFh to be written to the addressable unit(s) instead of the drive ID. In other embodiments, once the table 56 becomes full, the drive IDs in the table can be erased by way of a user-initiated maintenance procedure. An offset value can then be stored as part of the table or elsewhere on the storage medium. This offset value represents the number of entries in the table 56 and is used to compute new indices for additional drives. For example, if the table 56 has 32 entries and all 32 entries are occupied with drive IDs (i.e., 32 drive IDs of 32 different drives), all 32 drive IDs can be erased from the table. In this example, the offset value will be 32. When a drive subsequently attempts to write to an addressable unit, that new drive, being the first drive to write the storage medium following the erasure of the table 56, will be assigned an index value of 33 which is computed by adding an initial index value of 1 to the offset value of 32. Similarly, the next drive to write the storage medium will be assigned an index value of 33, and so on. The index values actually stored in the table 56 will be 1, 2, 3, etc., but are added to the offset value 32 when the table 56 is accessed.

Figure 5:
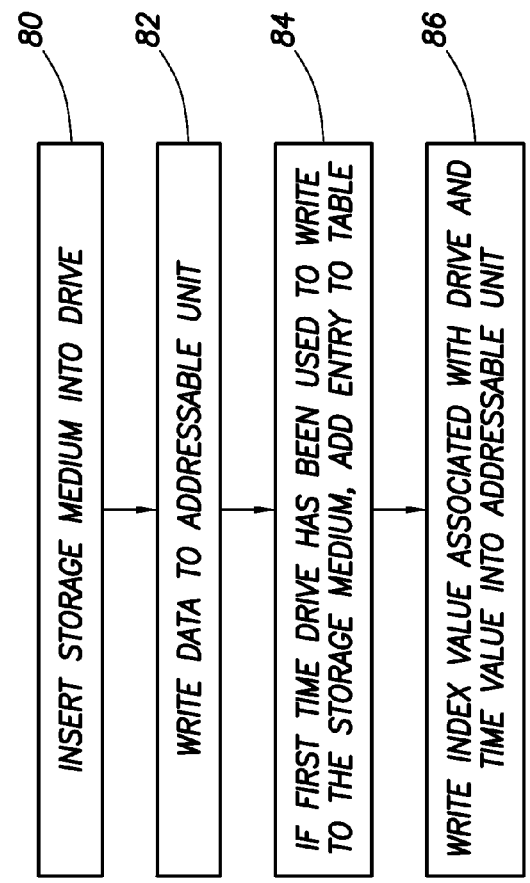
FIG. 5 shows an exemplary method embodiment.

FIG. 5 illustrates a corresponding method embodiment comprising acts 80-86. One or more of the acts depicted in FIG. 5 can be performed concurrently or sequentially and one or more acts can be omitted as desired. Further, the acts can be performed in a different order to that shown in FIG. 5. At 80, a user inserts a storage medium 32 into a storage drive 30. At 82, data is written to an addressable unit. If the storage drive 30 has never before written data to that particular storage medium 32, then the drive ID of the storage drive 30 will not be present in the storage medium's table 56. However, if the storage drive 30 has previously written data to the storage medium 32, then the drive ID of the storage drive 30 will be present in table 56. If this is the first time this particular storage drive 30 has written data to this particular storage drive, ascertained by examining the storage medium's table 56, then the drive's CPU 36 modifies the storage medium's drive ID table 56 by adding the drive's ID value to the table corresponding to a previously unused index value. Such a drive, for example, may add its drive ID to the table at the entry corresponding to index value 04 h (FIG. 3), which was previously marked as "reserved." If the drive already has written the storage medium 32, then the storage medium's drive ID table should already have an entry contained therein that lists the ID of the drive. Consequently, no modification of the drive ID table is performed in this case. At 86, the drive 30 writes its index value and a time value, obtained from time logic 28 or 40 to the addressable unit that is being written with data. In some embodiments, acts 82 and 86 are performed as one act, that is, data and the drive ID are written to the addressable unit in one write transaction. The drive ID table 56 is written before, during, or after writing data to the addressable units, yet before ejecting the media from the storage drive.

In accordance with the embodiments described above, index and time values are stored in the addressable units. The identifying values identify the drives writing the addressable units and the time values specify the associated time of the write transactions. The table 56 can be used to identify the particular drive that wrote an addressable unit given the associated index value. In another embodiment, the drive ID itself (or a system identifier) can be written to the addressable unit as the identifying value, rather than a corresponding index value. In this latter embodiment, the drive ID table (which facilitates a conversion between index values and drive IDs) is not used.

The embodiments described above result in storage media that contain audit information that can be used to identify which drives wrote specific addressable units of the storage media and the time at which the write transactions occurred. This audit information can be used in a variety of ways. For example, if an addressable unit of a storage medium 32 is determined to be defective and the index value written to that addressable unit can be determined, then, by examining the drive ID table, a determination can be made as to which drive last wrote that particular addressable unit. An examination of the time value associated with that addressable unit provides additional information regarding the time at which the drive wrote that addressable unit. The defective addressable unit may be caused by a problem with a particular storage device that can be uniquely identified from information in the addressable unit(s) that written by the storage drive and the medium's drive ID table. The time value may provide an indication of the longevity of the drive. Further, forensic analysis may be performed on the storage medium using the drive IDs and time values.

Figure 6:
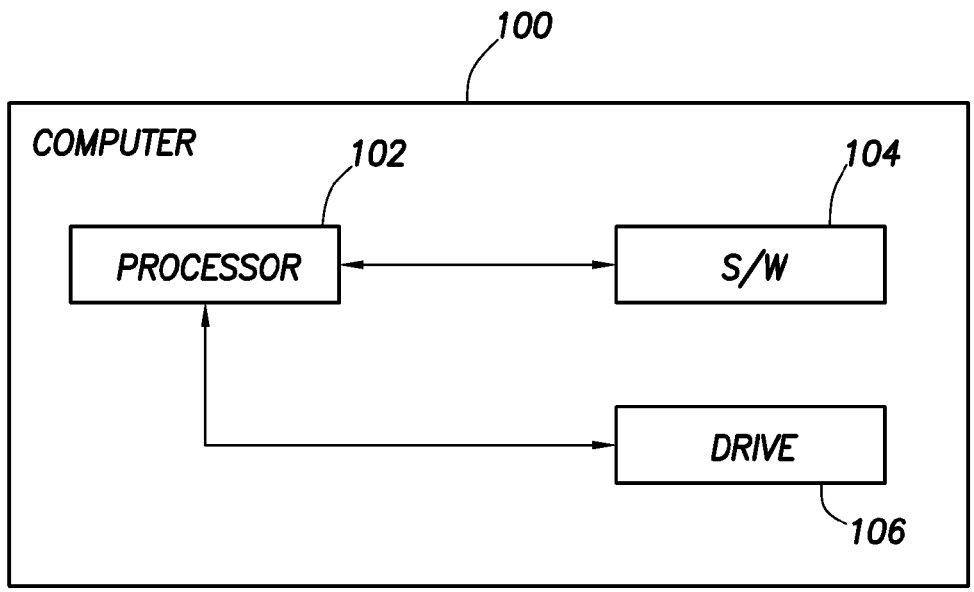
FIG. 6 illustrates a computer adapted to retrieve audit information from a storage medium.
Figure 7:
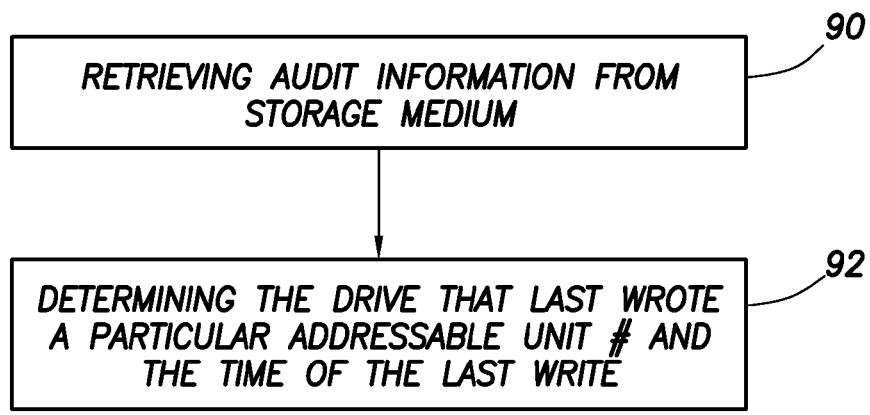
FIG. 7 shows a method embodiment to retrieve and process audit information from a removable storage medium.

In some embodiments, a computer can be used to implement a method to retrieve and process the audit information from a removable storage medium. An exemplary computer 100 is illustrated in FIG. 6 as comprising a processor 102 that executes software 104 suitable to implement the method. The computer 100 also comprises a drive 106 adapted receive a removable storage medium. A method that can be performed by computer 100 is illustrated in FIG. 7. The method comprises acts 90 and 92. Act 90 comprises retrieving audit information from the removable storage medium inserted into drive 106. Based on the audit information, the method further comprises at 92 determining the drive that last wrote a particular addressable unit (or a particular plurality of addressable units) and the time of the last write. The act of retrieving the audit information comprises, for example, retrieving a table 56 from the removable storage medium. The act of retrieving the information also comprises retrieving any index values stored on the addressable units of the removable storage medium that have previously been written with data and also retrieving the associated time values. The method further entails examining the storage medium's table 56 and determining if any index value(s) read from any of the addressable units on the storage medium contain matches to any index values contained in the table. The drive IDs stored in the table provide a mechanism by which the identity can be ascertained of any drive that has previously written data to an addressable unit of the storage medium and whose index value is stored such addressable unit.

Numerous variations and modifications will become apparent to those skilled in the art once the above disclosure is fully appreciated. For example, the teachings provided herein are applicable to computer systems as well as stand-alone storage devices such as optical disc video recorders.

What is claimed is:

1. A recorded non-transitory storage medium, comprising: a plurality of individually addressable units, wherein each of the plurality of addressable units comprises data and a time value, said time value indicative of the time at which the each addressable unit was written.

2. The recorded non-transitory storage medium of claim 1 wherein the time value comprises a value selected from a group consisting of date, time of day, and sequence number.

3. The recorded non-transitory storage medium of claim 1 wherein each addressable unit comprises one of a sector, a block, a cluster, and a track.

4. The recorded non-transitory storage medium of claim 1 wherein each addressable unit recorded with data further comprises an identifying value, each identifying value indicative of an identity of a system or a storage drive which recorded the recorded storage medium and distinguishing said system or storage drive from other systems or storage drives with which the recorded storage medium can be used.

5. The recorded non-transitory storage medium of claim 4, wherein an identifying value in at least one addressable unit comprises a predetermined value that indicates that the identity of the system or storage drive which recorded the at least one addressable unit is unknown.

6. The recorded non-transitory storage medium of claim 1 further comprising a table containing a plurality of drive identifiers, each drive identifier associated with a different storage drive.

7. The recorded non-transitory storage medium of claim 6 wherein each addressable unit includes an index value, each index value corresponding to the drive identifier for the specific storage drive recording the addressable unit.

8. The recorded non-transitory storage medium of claim 1 wherein said time value is a predetermined value.

* * * * *